US006627876B2

(12) United States Patent
Hager

(10) Patent No.: US 6,627,876 B2
(45) Date of Patent: Sep. 30, 2003

(54) METHOD OF REDUCING SPACE CHARGE IN A LINEAR ION TRAP MASS SPECTROMETER

(75) Inventor: James W. Hager, Mississauga (CA)

(73) Assignee: MDS Inc., Concord (CA)

( * ) Notice: Subject to any disclaimer, the term of this patent is extended or adjusted under 35 U.S.C. 154(b) by 0 days.

(21) Appl. No.: 10/232,588

(22) Filed: Aug. 30, 2002

(65) Prior Publication Data

US 2003/0042415 A1 Mar. 6, 2003

Related U.S. Application Data

(60) Provisional application No. 60/315,715, filed on Aug. 30, 2001.

(51) Int. Cl.[7] .......................... B01D 59/44; H01J 49/00

(52) U.S. Cl. ...................... 250/282; 252/492.2; 430/30; 430/942; 313/389

(58) Field of Search .................. 430/30, 942; 313/389; 250/492.2

(56) References Cited

U.S. PATENT DOCUMENTS 2,939,952 A * 6/1960 Paul et al. .................. 250/292
4,755,670 A * 7/1988 Syka et al. .................. 250/292
5,107,109 A 4/1992 Stafford, Jr. et al.
5,179,278 A * 1/1993 Douglas ..................... 250/290
5,420,425 A * 5/1995 Bier et al. .................. 250/292
5,559,325 A 9/1996 Franzen
5,572,022 A 11/1996 Schwartz et al.
6,011,259 A * 1/2000 Whitehouse et al. ....... 250/287
6,177,668 B1 * 1/2001 Hager ........................ 250/282

* cited by examiner

*Primary Examiner*—John R. Lee
*Assistant Examiner*—Erin-Michael Gill
(74) *Attorney, Agent, or Firm*—Bereskin & Parr

(57) ABSTRACT

A method of setting a fill time for a mass spectrometer including a linear ion is provided. The mass spectrometer is operated first in a transmission mode and ions are supplied to the mass spectrometer. Ions are detected as they pass through at least part of the mass spectrometer in a preset time period, to determine the ion current. From a desired maximum charge density for the ion trap and the ion current, a fill time for the ion trap is determined. The mass spectrometer is operated in a trapping mode to trap ions in the ion trap, and the ion trap is filled for the fill time, as just determined. This utilizes the ion trap to its maximum, while avoiding problems due to overfilling the trap, causing space charge effects.

6 Claims, 5 Drawing Sheets

METHOD OF REDUCING SPACE CHARGE IN A LINEAR ION TRAP MASS SPECTROMETER

FIELD OF THE INVENTION

This invention relates to ion trap mass spectrometers and more particularly to controlling and reducing space charge effects in such mass spectrometers.

BACKGROUND OF THE INVENTION

Conventional ion trap mass spectrometers, of the kind described in U.S. Pat. No. 2,939,952, are generally composed of three electrodes, namely a ring electrode, and a pair of end cap electrodes. Appropriate applied RF and DC voltages are applied to the electrodes to establish a three dimensional field which traps ions within a specified mass-to-charge range. Linear quadruples can also be configured as ion trap mass spectrometers where radial confinement is provided by an applied RF voltage and axial confinement by DC barriers at the ends of the rod array. Mass selective detection of ions trapped within a linear ion trap can be accomplished by ejecting the ions radially, as taught by U.S. Pat. No. 5,420,425, or by ejecting the ions axially, as taught by U.S. Pat. No. 6,177,668. Ions may also be detected in situ using Fourier Transform techniques, as taught by U.S. Pat. No. 4,755,670.

The performance of any ion trap mass spectrometer is strongly influenced by the trapped ion density. Whenever this ion density increases above a particular limit, the resolution and mass assignment accuracy degrade. In extreme cases the mass spectral peaks can be completely smeared out and little useful information obtained. Accordingly, it is desirable to provide a method for rapid determination of the ion current provided by the ion source so that the number of ions injected into a linear ion trap mass spectrometer can be adjusted for optimal mass spectrometry performance.

Linear ion trap mass spectrometers are variations of 2-dimensional quadruple mass spectrometers or other multiple devices, which allow ion trapping by means of a two-dimensional quadruple, or multiple, field applied in the radial dimension and DC barriers applied at the ends of the device. Such linear ion traps may be fabricated from straight or curved rod-type electrodes. Quadruple ion traps, at least, then permit mass selective ejection from the quadruple followed by ion detection. U.S. Pat. No. 6,177,668 teaches that the ion path of a standard triple quadruple mass spectrometer can be configured such that one of the quadruples can be operated as a linear ion trap mass spectrometer. Such an instrument offers the capabilities of both an ion trap operational mode with the associated high sensitivity and the conventional operation mode of a standard triple quadruple mass spectrometer on the same platform, which is an advantage. The present inventor found that by combining the capabilities of both standard triple quadruple and linear ion trap modes a very rapid method of space charge minimization can be obtained. The invention is, in general, applicable to any linear ion trap capable of operating in both a trapping mode and a continuous transmission mode.

SUMMARY OF THE PRESENT INVENTION

In accordance with the present invention, there is provided a method of setting a fill time for a mass spectrometer including a linear ion trap the method comprising:

(a) operating the mass spectrometer in a transmission mode;

(b) supplying ions to the mass spectrometer;

(c) detecting ions passing through at least part of the mass spectrometer in a preset time period to determine the ion current;

(d) from a desired maximum charge density for the ion trap and the ion current determining a fill time for the ion trap;

(e) operating the mass spectrometer in a trapping mode to trap ions in the ion trap, and filling the ion trap for the fill time determined in step (d); and (f) obtaining an analytical spectrum from ions trapped in the ion trap.

DESCRIPTION OF DRAWING FIGURES

For a better understanding of the present invention and to show more clearly how it may be carried into effect, reference will now be made, by way of example, to the accompanying drawings, in which.

Figure 5A:
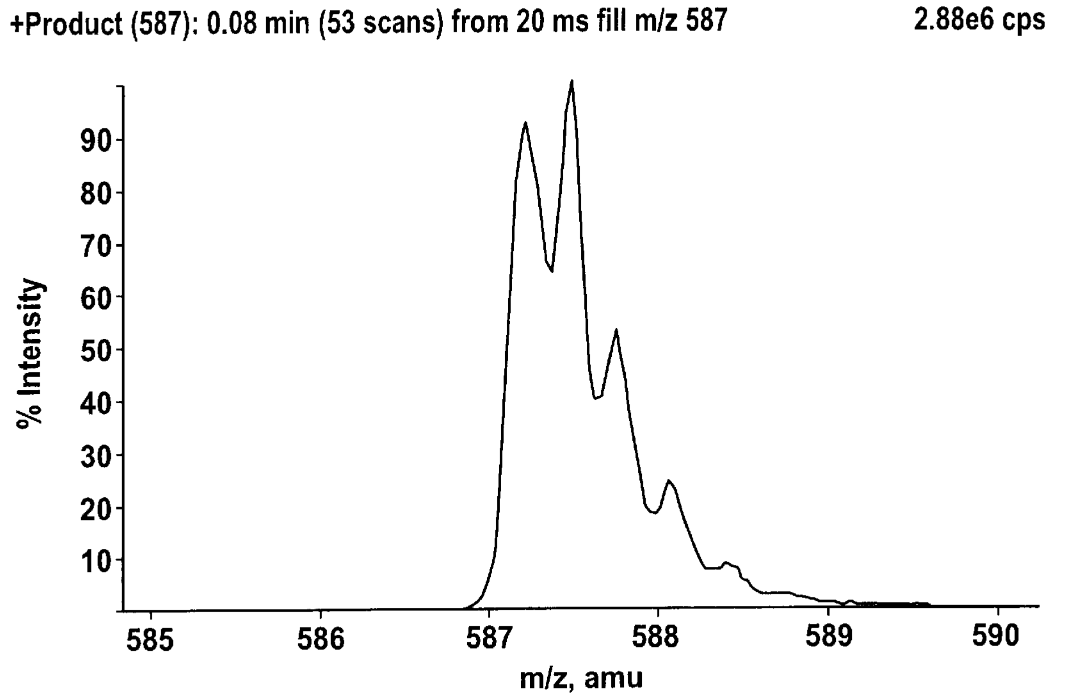
Figure 5B:
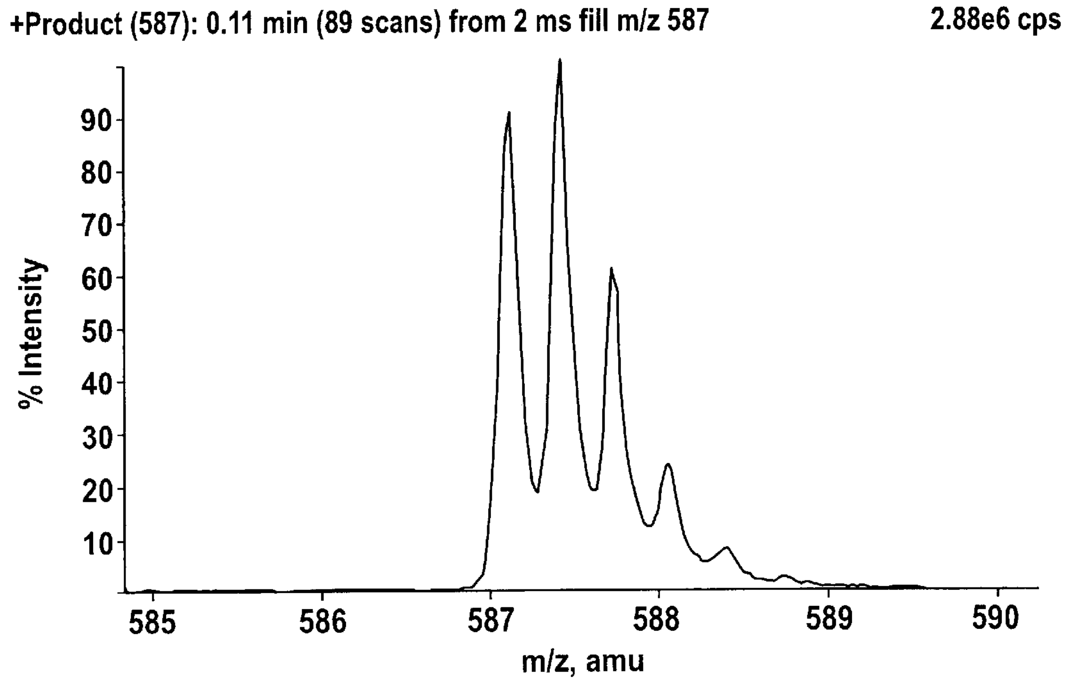

FIGS. 5*a* and 5*b* show a trapped ion spectrum for different fill times.

DESCRIPTION OF THE INVENTION

Figure 1:
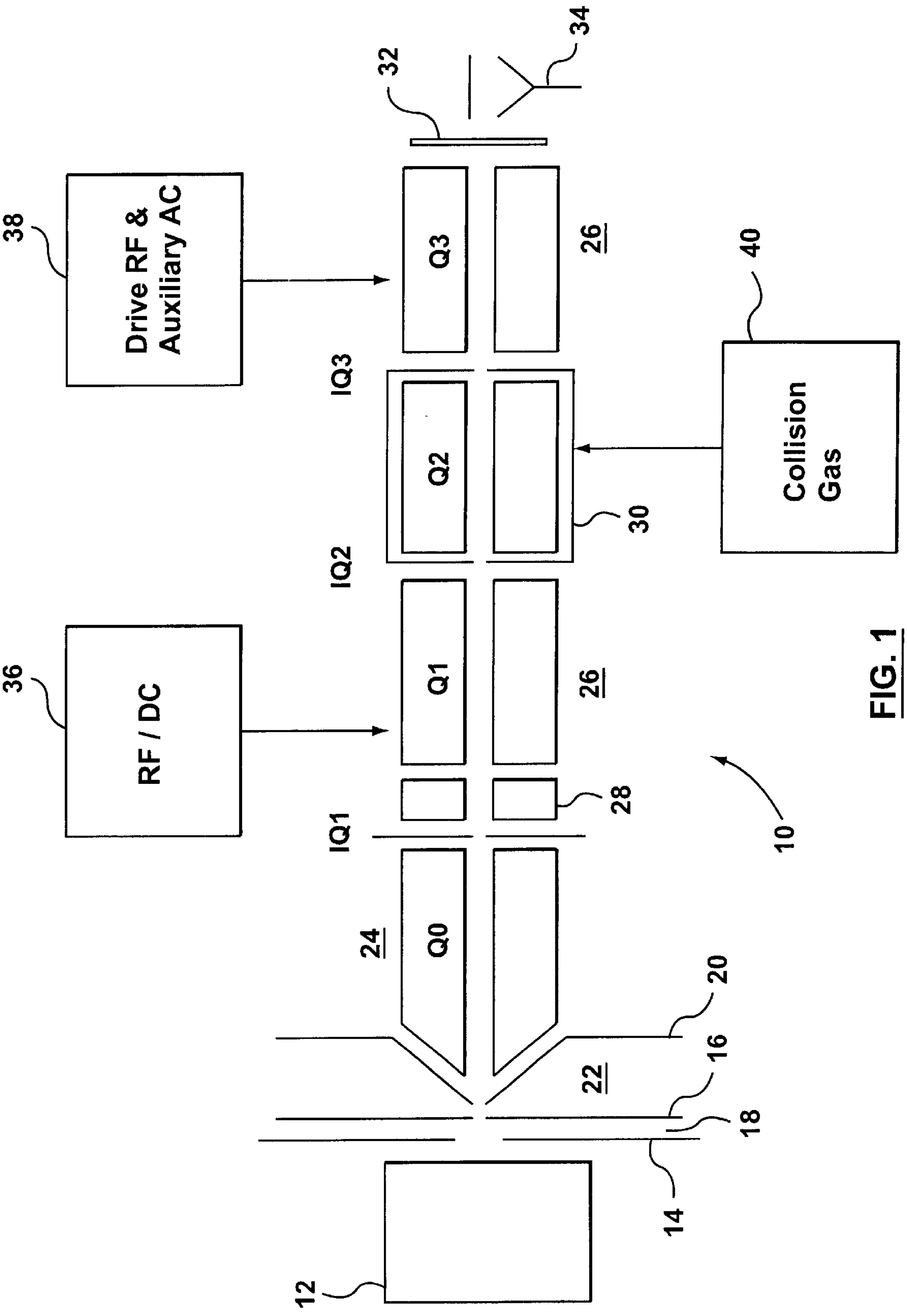
FIG. 1 is a schematic view of a conventional triple quadruple mass spectrometer.

Referring first to FIG. 1, there is shown a conventional triple quadruple mass spectrometer apparatus generally designated by reference 10. An ion source 12, for example an electrospray ion source, generates ions directed towards a curtain plate 14. Behind the curtain plate 14, there is an orifice plate 16, defining an orifice, in known manner.

A curtain chamber 18 is formed between the curtain plate 14 and the orifice plate 16, and a flow of curtain gas reduces the flow of unwanted neutrals into the analyzing sections of the mass spectrometer.

Following the orifice plate 16, there is a skimmer plate 20. An intermediate pressure chamber 22 is defined between the orifice plate 16 and the skimmer plate 20 and the pressure in this chamber is typically of the order of 2 Torr.

Ions pass through the skimmer plate 20 into the first chamber of the mass spectrometer, indicated at 24. A quadruple rod set Q0 is provided in this chamber 24, for collecting and focusing ions. This chamber 24 serves to extract further remains of the solvent from the ion stream, and typically operates under a pressure of 7 mTorr. It provides an interface into the analyzing sections of the mass spectrometer.

A first interquad barrier or lens IQ1 separates the chamber 24 from the main mass spectrometer chamber 26 and has an aperture for ions. Adjacent the interquad barrier IQ1, there is a short "stubbies" rod set, or Brubaker lens 28.

A first mass resolving quadruple rod set Q1 is provided in the chamber 26 for mass selection of a precursor ion. Following the rod set Q1, there is a collision cell of 30 containing a second quadruple rod set Q2, and following the collision cell 30, there is a third quadruple rod set Q3 for effecting a second mass analysis step.

The final or third quadruple rod set Q3 is located in the main quadruple chamber 26 and subjected to the pressure therein typically $1\times10^{-5}$ Torr. As indicated, the second quadruple rod set Q2 is contained within an enclosure forming the collision cell 30, so that it can be maintained at a higher pressure; in known manner, this pressure is analyte dependent and could be 5 mTorr. Interquad barriers or lens IQ2 and IQ3 are provided at either end of the enclosure of the collision cell of 30.

Ions leaving Q3 pass through an exit lens 32 to a detector 34. It will be understood by those skilled in the art that the representation of FIG. 1 is schematic, and various additional elements would be provided to complete the apparatus. For example, a variety of power supplies are required for delivering AC and DC voltages to different elements of the apparatus. In addition, a pumping arrangement or scheme is required to maintain the pressures at the desired levels mentioned.

As indicated, a power supply 36 is provided for supplying RF and DC resolving voltages to the first quadruple rod set Q1. Similarly, a second power supply 38 is provided for supplying drive RF and auxiliary AC voltages to the third quadruple rod set Q3, for scanning ions axially out of the rod set Q3. A collision gas is supplied, as indicated at 40, to the collision cell 30, for maintaining the desired pressure therein, and an RF supply would also be connected to Q2 within the collision cell 30.

The apparatus of FIG. 1 is based on an Applied Biosystems/MDS SCIEX API 2000 triple quadruple mass spectrometer. In accordance with the present invention, the third quadruple rod set Q3 is modified to act as a linear ion trap mass spectrometer with the ability to effect axial scanning and ejection as disclosed in U.S. Pat. No. 6,177,668 utilizing an auxiliary dipolar AC voltage (not shown in FIG. 1) to effect ion ejection. The instrument retains the capability to be operated as a conventional triple quadruple mass spectrometer.

The standard scan function, detailed in U.S. Pat. No. 6,177,668, involves operating Q3 as a linear ion trap. Analyte ions are admitted into Q3, trapped and cooled. Then, the ions are mass selectively scanned out through the exit lens 32 to the detector 34. Ions are ejected when their radial secular frequency matches that of a dipolar auxiliary AC signal applied to the rod set Q3 due to the coupling of the radial and axial ion motion in the exit fringing field of the linear ion trap Ion ejection in the direction normal to the axis of the linear ion trap can also be effected as taught by U.S. Pat. No. 5,420,425. Trapped ions may also be ejected by means of an auxiliary voltage applied in a quadrupolar fashion or without any auxiliary voltage by utilizing the q~0.907 stability boundary. Trapped ions may also be detected in situ as taught by U.S. Pat. No. 4,755,670.

Figure 2:
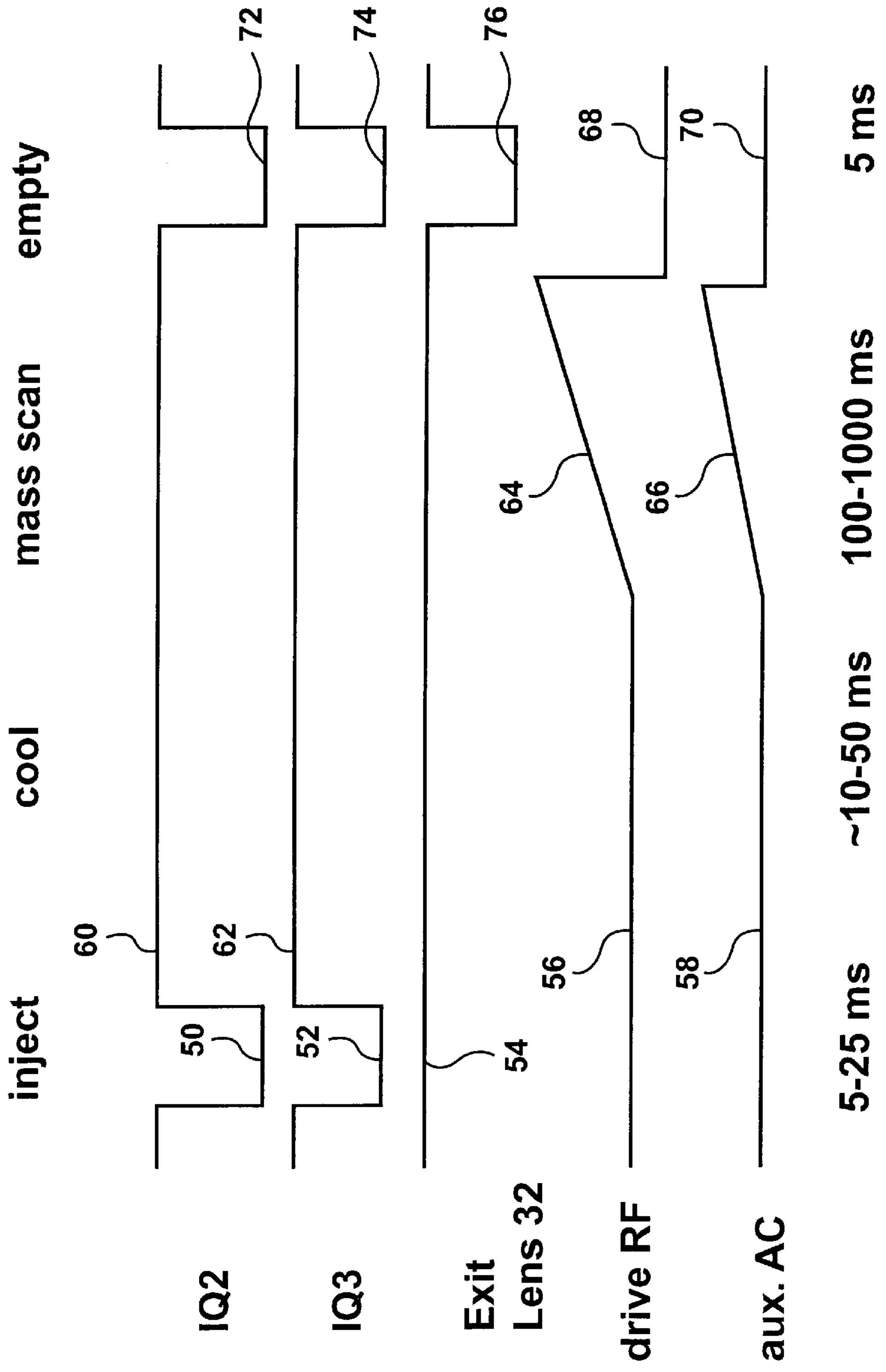
FIG. 2 is a timing diagram for a conventional scan function carried out on the mass spectrometer of FIG. 1.

The conventional timing diagram for the axial ejection scan function is displayed in FIG. 2. In an initial injection phase, the DC voltages at IQ2 and IQ3 are maintained low, as indicated at 50 and 52, while simultaneously the exit lens 32 is maintained at a high DC voltage 54. This allows ions passage through rod sets Q1 and Q2 into Q3, and Q3 functions as an ion trap preventing ions leaving from Q3. At this time, the drive RF and auxiliary AC voltages applied to Q3, are maintained at low voltages indicated at 56 and 58 in FIG. 2. The injection period typically lasts for 5–25 milliseconds.

Following this there is a cooling period, during which voltages IQ2 and IQ3 are raised to levels indicated at 60 and 62, to prevent further passage of ions. The voltage of the exit lens 32 is maintained at the voltage 54. Consequently, ions are completely trapped within Q3, and are prevented from exiting from Q3 in either direction and also are radially confined by the quadrupolar field. The drive RF and auxiliary AC voltages applied to quadruple rod set Q3 are maintained at levels 56 and 58. This cooling period lasts 10–50 milliseconds.

Once the ions have been cooled, the ions are scanned out in a mass scan period, during which the DC voltages on the lens IQ2 and IQ3 are maintained at the high, blocking voltage levels 60, 62 and the exit lens 32 is maintained at the voltage level 54. These voltages are normally sufficient to maintain the ions trapped.

However, in accordance with U.S. Pat. No. 6,177,668, during this mass scan period, the drive RF and auxiliary AC voltages applied to the quadruple rod set Q3 are scanned as indicated at 64 and 66. This causes ions to be scanned out in a mass selective fashion through the ion lens 32 to the detector 34.

At the end of the mass scanning period, the drive RF and auxiliary AC voltages are returned to zero, as indicated at 68 and 70. Simultaneously, the DC potentials applied to the lens or barriers IQ2 and IQ3 are reduced to zero as indicated at 72 and 74, and correspondingly the voltage on the exit lens 32 is reduced to zero as indicated at 76. This serves to empty the ion trap, formed by Q3, of ions.

Conventional 3-dimensional ion traps, including quadruple linear ion traps, are susceptible to the effect of space charge primarily due to their small volume and the relatively high pressures at which they operate. Many techniques have been developed to maintain the trapped ion current within pre-specified ranges to minimize the deleterious effects of space charge. Most of these techniques, such as those disclosed in U.S. Pat. No. 4,771,172, rely on rapid "pre-scans" in which the content of the 3-dimensional ion trap is interrogated via a rapid mass selective scan of the contents of the ion trap itself. Such fast pre-scans typically require 50–200 ms to complete, i.e., they do require a significant amount of time. The detected ion signal is then compared to some pre-specified limit, and the fill time of subsequent "analytical" scans adjusted to give optimum mass spectroscopic performance. U.S. Pat. No. 5,572,022 discloses a method of increasing the dynamic range of a conventional 3-dimensional ion trap by placement of a resolving quadruple mass spectrometer in front of the ion trap. However, the step of determining the appropriate ion trap fill time is still based on trapping and rapid mass selective scanning out of the trap contents prior to the analytical scan. The method of the present invention provides for determination of the ion beam intensity via measurements of the entire ion path in transmission, rather than trapping, mode.

The ion path of the current apparatus allows a much simpler and more rapid technique for determining the analyte intensity emitted from the ion source, and the analyte intensity, once determined, can be used to adjust the fill time of the Q3 linear ion trap. The method described herein utilizes the fact that, in the triple quadruple instrument 10, there exists a resolving RF/DC quadruple Q1 in the ion path between the ion source 12 and the detector 34 and that the ion current passing through this RF/DC quadruple Q1 can be directly measured by the ion detector 34 without having to trap the ions in the ion trap (available in Q3) and performing a mass scan of the ion trap itself. The ion path, being derived from that of a standard triple quadruple mass spectrometer, is well suited to making ion intensity measurements in direct transmission mode with the quadruples in a combination of resolving RF/DC and fully transmitting RF-only modes. In one embodiment, the detected ion signal from the resolving Q1 mass spectrometer is measured while the Q3 linear ion trap is operated in RF-only transmission, or "ion pipe", mode to obtain a very rapid measure of the ion flux emitted from the ion source at a particular m/z range that is used to adjust the fill time for subsequent Q3 linear ion trap mass selective scans. The advantages of this technique are that the resolved Q1 signal can be obtained very rapidly (in <10 ms) and that the ion intensity is a direct measure of the number of ions that will be directed into the Q3 linear ion trap in subsequent mass selective ion trap scans.

Figure 3:
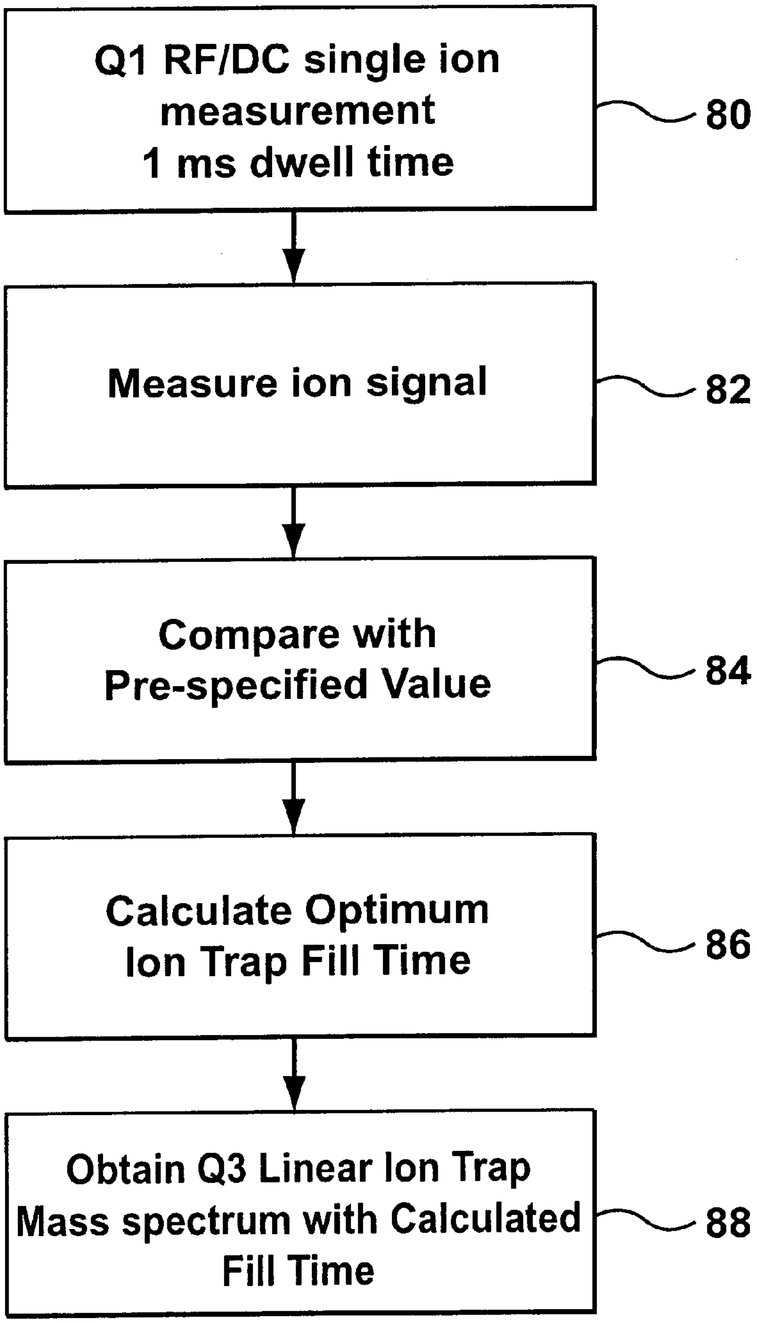
FIG. 3 is a timing diagram, in accordance with the present invention, for minimizing space charge effects.

FIG. 3 displays the timing diagram for a series of mass spectrometry scans employed to minimize the effects of space charge, in accordance with the present invention. The first step 80 is to set the ion path to triple quadruple mode, i.e. with Q1 configured as an RF/DC quadruple transmitting mass spectrometer and both Q2 and Q3 configured as RF-only quadrupoles. Q1 is set to the m/z value of the ion to be measured with the desired resolution as is conventionally done with triple quadrupole mass spectrometers Next, at 82, the number of ions at the ion detector is measured in a single 1 ms measurement period. Then, the ion path can be re-configured as a linear ion trap mass spectrometer. This can be done very quickly (<1 ms) because it only involves resetting several of the DC and RF voltages. The optimum fill time of the Q3 linear ion trap is determined at 84, by comparing the number of ions detected in the previous RF/DC transmission mode of operation with a pre-selected value. The optimum ion trap fill time is calculated at 86, and a Q3 linear ion trap mass spectrum is generated at 88. Thus, the optimum Q3 linear ion trap fill time is determined very rapidly without having to trap ions in Q3 and perform a mass scan.

Figure 4:
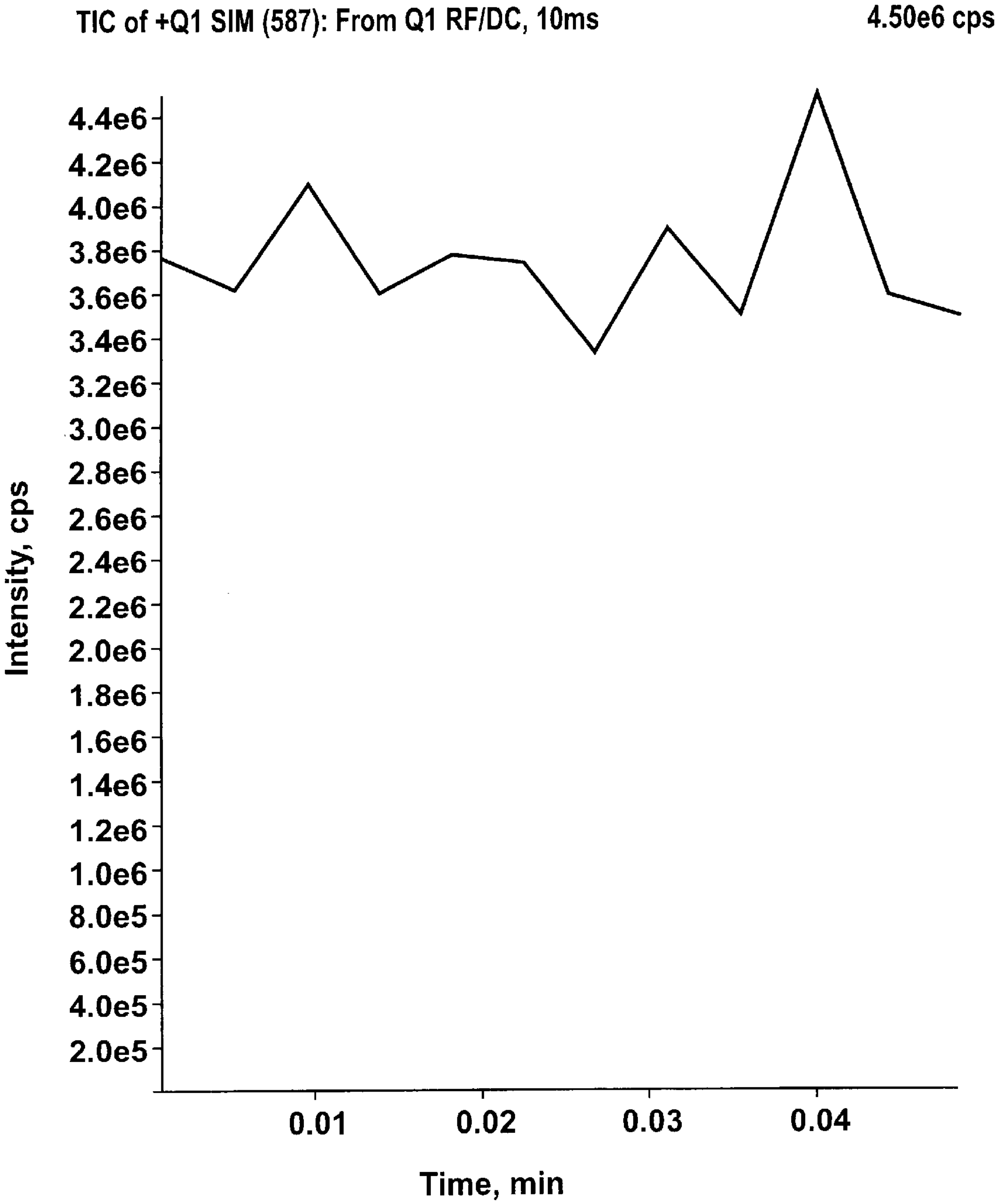
FIG. 4 is a graph showing variation of ion intensity with time.

An example of the method of the present invention will now be described. FIG. 4 shows the Q1 ion intensity of a 10 picomoles/microliter solution of renin substrate tetradecapeptide measured at m/z 587 obtained by setting the resolution of the RF/DC Q1 quadrupole mass spectrometer to approximately 3 amu and operating Q2 and Q3 in RF-only transmission mode. This m/z corresponds to the $(M+3H)^{3+}$ renin substrate ion. The measurement time has been chosen to be 10 ms and 10 scans separated by about 290 ms (the timing here being determined by the experimental equipment available) have been displayed for clarity. The intensity from a single scan of a few milliseconds would be sufficient. The peak ion intensity at the detector was measured to be about $3.8\times10^6$ counts/sec, which corresponds to $3.8\times10^4$ detected ions in the 10 ms measurement time. It has been found empirically that for a quadrupole of standard dimensions, the best performance is obtained with admission of <10,000 ions into the Q3 linear ion trap mass spectrometer. Thus an appropriate fill time based on the measured continuous ion beam intensity measured in FIG. 4 is <2.5 ms.

FIG. 5 displays the trapped ion mass spectrum of the m/z 587 renin substrate ion using a fill time of 20 ms (upper trace, FIG. 5*a*) and 2 ms (lower trace, FIG. 5*b*). The longer fill time results in the degraded resolution and slight shift to higher value of the apparent mass, while FIG. 5*b* shows noticeably better resolution. These differences are symptomatic of space charge at the longer fill time. The pre-measurement of the resolved Q1 ion intensity, however, allows the optimum fill time to be determined rapidly.

The total ion current in transmission mode can be measured with all of the quadrupoles comprising the ion path operated as RF-only quadruples. This can also provide useful information for determining the appropriate fill time for the Q3 linear ion trap in subsequent experiments. This can be useful to determine the total ion current from a source, as compared to the ion current at a certain mass or narrow range of masses.

It is not necessary for a resolving quadrupole to be placed in front of the linear ion trap mass spectrometer as described above. The Q3 linear ion trap itself can be used to make the appropriate intensity measurements of the incoming ion beam since it too can be operated as a conventional RF/DC quadrupole mass spectrometer. In this embodiment other upstream quadrupoles (e.g., Q1, Q2) would be operated as RF-only transmission quadrupoles and the intensity of a chosen m/z range would be set by Q3 in RF/DC mode with no ion trapping implemented. The timing sequence is the same as that shown in FIG. 3 with the exception of a brief Q3 ion measurement cycle in place of the Q1 measurement step 80.

It is to be understood that this method is applicable with any mass spectrometer system that includes a linear ion trap mass spectrometer that has the capability of being operated as a conventional RF/DC quadruple mass spectrometer, such as a QqTOF mass spectrometer, which is similar to the triple quadrupole instrument shown but has a Time of Flight (TOF) section replacing the final quadrupole Q3 and detector.

It will also be understood that where a mass spectrometer has a plurality of different elements or sections, e.g., the individual quadrupole sections of a triple quadrupole mass spectrometer, it is not always necessary to pass the ion current through the entire instrument in the transmission made. For some types of instruments, it may be possible or preferable, to detect ions part way through the instrument and even upstream from the ion trap. This should still give an accurate measure of the ion current that would be received by the ion trap.

What is claimed is:

1. A method of setting a fill time for a mass spectrometer including a linear ion trap the method comprising:

(a) operating the mass spectrometer in a transmission mode;

(b) supplying ions to the mass spectrometer;

(c) detecting ions passing through at least part of the mass spectrometer in a preset time period to determine the ion current;

(d) from a desired maximum charge density for the ion trap and the ion current determining a fill time for the ion trap;

(e) operating the mass spectrometer in a trapping mode to trap ions in the ion trap, and filling the ion trap for the fill time determined in step (d); and (f) obtaining an analytical spectrum from ions trapped in the ion trap.

2. A method as claimed in claim 1, which includes effecting the method in a mass spectrometer including at least one multiple rod set, and during steps (a), (b) and (c): applying RF and DC voltages to said at least one multiple rod set to mass select ions having a m/z value in a desired range; and operating any other multiple rod set in a transmission mode.

3. A method as claimed in claim 2, when carried out in a triple quadrupole mass spectrometer, including first, second and third quadrupole rod sets with the third rod set configured as an ion trap, the method further comprising: operating two of said quadrupole rod sets in transmission mode and applying said RF and DC voltages to the other of said quadrupole rod sets.

4. A method as claimed in claim 3, wherein the first quadrupole rod set is selected as the other of said quadrupote rod sets and is supplied with the RF and DC voltages.

5. A method as claimed in claim 1 which includes effecting the method in a triple quadrupole mass spectrometer, including first, second and third quadrupole rod sets with one rod set configured as an ion trap, wherein at least two of the rod sets are supplied with RF and DC voltages to mass select ions having a m/z value in a desired range, and any other multiple rod set, not supplied with RF and DC voltages, is operated in a transmission mode.

6. A method as claimed in claim 2, 3 or 4, including setting the RF and DC voltages to mass select ions with a desired m/z ratio.

* * * * *

UNITED STATES PATENT AND TRADEMARK OFFICE

CERTIFICATE OF CORRECTION

PATENT NO. : 6,627,876 B2

DATED : September 30, 2003

INVENTOR(S) : James W. Hager

It is certified that error appears in the above-identified patent and that said Letters Patent is hereby corrected as shown below:

<u>Column 6</u>,
Line 26, delete “made” and substitute -- mode --; and
Line 63, delete “quadrupote” and substitute -- quadrupole --.

Signed and Sealed this

Ninth Day of December, 2003

JAMES E. ROGAN
*Director of the United States Patent and Trademark Office*